United States Patent
Iwasaki

(10) Patent No.: US 9,600,737 B2
(45) Date of Patent: Mar. 21, 2017

(54) IMAGE FEATURE EXTRACTION METHOD, IMAGE FEATURE EXTRACTION APPARATUS, AND RECORDING MEDIUM STORING PROGRAM THEREFOR

(71) Applicant: CANON KABUSHIKI KAISHA, Tokyo (JP)

(72) Inventor: Yasushi Iwasaki, Yokohyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/945,920

(22) Filed: Nov. 19, 2015

(65) Prior Publication Data
US 2016/0155010 A1  Jun. 2, 2016

(30) Foreign Application Priority Data
Nov. 28, 2014 (JP) .................. 2014-242461

(51) Int. Cl.
*G06K 9/34* (2006.01)
*G06K 9/46* (2006.01)
*G06K 9/62* (2006.01)
*G06T 7/00* (2006.01)

(52) U.S. Cl.
CPC ............. *G06K 9/46* (2013.01); *G06K 9/6267* (2013.01); *G06T 7/0079* (2013.01); *G06T 7/0081* (2013.01); *G06T 2207/10024* (2013.01); *G06T 2207/20021* (2013.01)

(58) Field of Classification Search
CPC ...... G06K 9/46; G06K 9/6267; G06T 7/0081; G06T 2207/10024; G06T 7/0079; G06T 2207/20021

USPC .................................. 382/173, 190
See application file for complete search history.

(56) References Cited

U.S. PATENT DOCUMENTS

| 6,778,699 B1* | 8/2004 | Gallagher | G06K 9/4604 382/165 |
| 7,206,437 B2* | 4/2007 | Kramer | G06K 9/4642 382/125 |
| 2009/0179998 A1* | 7/2009 | Steinberg | G06T 7/0042 348/222.1 |
| 2010/0097455 A1* | 4/2010 | Zhang | G06K 9/00798 348/119 |

(Continued)

FOREIGN PATENT DOCUMENTS

| JP | 2006-202100 A | 8/2006 |
| JP | 2013-214155 A | 10/2013 |

OTHER PUBLICATIONS

Minagawa, A., et al., "Line Clustering with Vanishing Point and Vanishing Line Estimation", The Information Processing Society of Japan, Jan. 22, 1999, pp. 65-72, vol. 99, No. 3.

(Continued)

*Primary Examiner* — Kanjibhai Patel
(74) *Attorney, Agent, or Firm* — Canon USA Inc., IP Division

(57) ABSTRACT

A feature extraction method includes acquiring an image, detecting a vanishing point in the image, setting a plurality of ellipses and a plurality of half-lines with respect to the detected vanishing point to segment the image into a plurality of regions, and extracting a feature of each segmented region. With the disclosed method, a global feature can be appropriately extracted from an image including a vanishing point or other relevant features.

9 Claims, 9 Drawing Sheets

(56) References Cited

U.S. PATENT DOCUMENTS

2010/0329542 A1* 12/2010 Ramalingam ...... G01C 21/3602
382/154

OTHER PUBLICATIONS

Felzenszwalb, P.F., et al., "Efficient Graph-Based Image Segmentation", pp. 1-26.

* cited by examiner

IMAGE FEATURE EXTRACTION METHOD, IMAGE FEATURE EXTRACTION APPARATUS, AND RECORDING MEDIUM STORING PROGRAM THEREFOR

BACKGROUND OF THE INVENTION

Field of the Invention

The present invention relates to a technique for segmenting an image into a plurality of regions and extracting relevant features of the image from the segmented regions.

Description of the Related Art

Conventionally, a method for extracting a global feature from an entire image (feature extraction method) using block segmentation has been known. In the conventional feature extraction method, a plurality of straight lines are drawn vertically and horizontally to segment an image into a plurality of blocks (regions), and a feature such as a mean value of color information and histogram is extracted from each block region. In this manner, a global feature of the entire image can be extracted.

Further, Japanese Patent Application Laid-Open No. 2006-202100 discusses a technique for extracting feature amounts of regions on radial lines and a circumference of a circular anti-counterfeiting mark to prevent forgery of banknotes.

In an image including a vanishing point, an edge is likely to exist at a distance measured radially from the vanishing point. Furthermore, an object is likely to be located on a concentric circle centered at the vanishing point. Thus, it is difficult to extract features appropriately by segmenting an image including a vanishing point into blocks and then extracting features therefrom.

Further, according to the technique discussed in Japanese Patent Application Laid-Open No. 2006-202100, only the feature amounts of the regions on the radial lines and the circumference of the anti-counterfeiting mark for preventing forgery of banknotes are extracted to determine whether the mark is genuine. Therefore, it is not sufficient for appropriate extraction of a global feature of an image including a vanishing point.

SUMMARY OF THE INVENTION

According to an aspect of the present invention, a feature extraction method includes acquiring an image, detecting a vanishing point in the acquired image, setting m ellipses and n half-lines with respect to the detected vanishing point to segment the image into a plurality of regions, and extracting a feature of each region segmented by the set ellipses and half-lines, wherein, in a case where m=0, n is an integer satisfying n≥2, and in a case where m is an integer satisfying m≥1, n is an integer satisfying n≥0.

Further features of the present invention will become apparent from the following description of exemplary embodiments with reference to the attached drawings.

DESCRIPTION OF THE EMBODIMENTS

Various exemplary embodiments of the present invention will be described in detail below with reference to the drawings.

Figure 1:
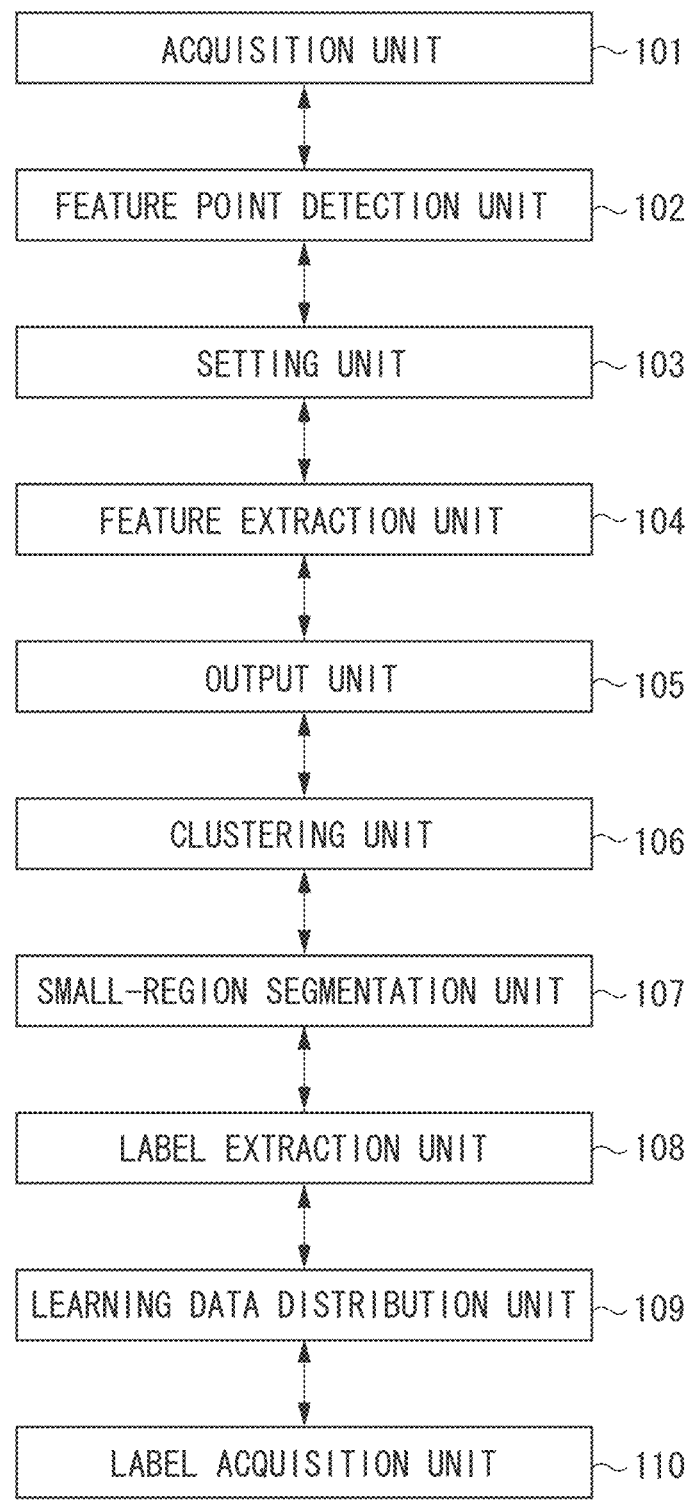
FIG. 1 is a functional block diagram illustrating sections of a feature extraction apparatus according to an exemplary embodiment of the present invention.

FIG. 1 illustrates a configuration (functional configuration) of a feature extraction apparatus according to an exemplary embodiment of the present invention. A central processing unit (CPU), such as a micro processor or a group of micro processors, included in the feature extraction apparatus executes a control program (algorithm and executable instructions) stored in a storage unit such as a read-only memory (ROM), a random access memory (RAM), etc. to implement or control each function of the various units illustrated in FIG. 1.

The feature extraction apparatus according to the present exemplary embodiment includes an acquisition unit 101, a feature point detection unit 102, and a setting unit 103. The acquisition unit 101 acquires an image having a feature to be extracted. The feature point detection unit 102 detects a vanishing point in the acquired image. The setting unit 103 sets ellipses and half-lines on the acquired image based on the detected vanishing point, and thereby segments the image into a plurality of regions. The feature extraction apparatus further includes a feature extraction unit 104, an output unit 105, and a clustering unit 106. The feature extraction unit 104 extracts a feature amount of each segmented region of the image. The output unit 105 outputs the feature amounts as data. The clustering unit 106 performs clustering on the feature amounts to divide the image into groups.

The feature extraction apparatus further includes a small-region segmentation unit 107 and a label extraction unit 108 to execute processing to acquire a label for each small region of the image divided into groups. The small-region segmentation unit 107 segments an image into small regions. The label extraction unit 108 extracts a label corresponding to a feature amount from each small region of a correct answer label image for learning. The feature extraction apparatus further includes a learning data distribution unit 109 and a label acquisition unit 110. The learning data distribution unit 109 distributes to each cluster a label corresponding to the feature amount learned as learning data. The label acquisition unit 110 acquires a label of a small region of an image to be identified based on the label distributed to the cluster.

The functions of the respective units of the feature extraction apparatus will be described in detail with reference to the flow process according to the present exemplary embodiment.

Figure 2:
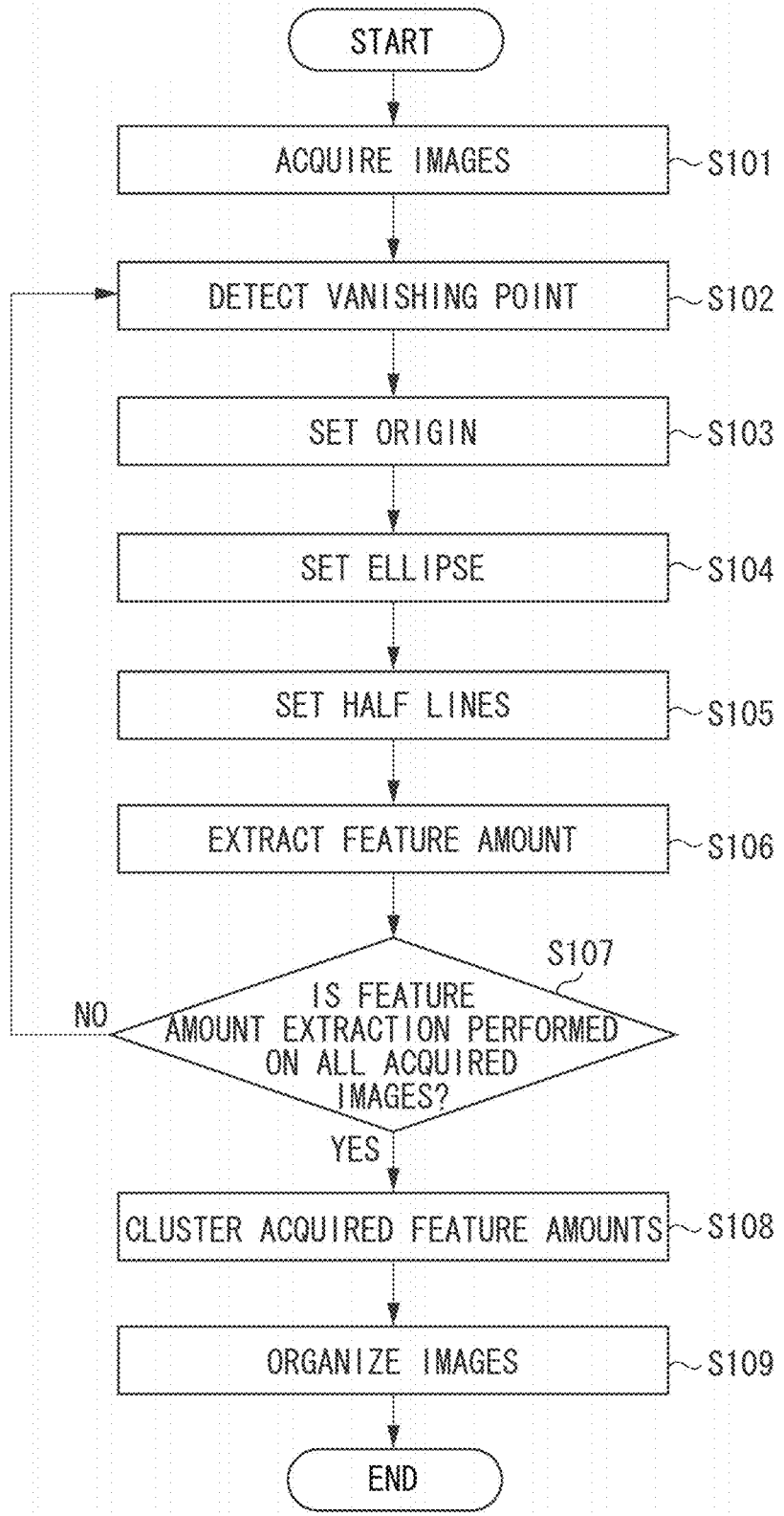
FIG. 2 illustrates a flow of a feature extraction process according to an exemplary embodiment of the present invention.

FIG. 2 illustrates a flow of a feature extraction process according to the present exemplary embodiment. In the process, the processing performed in steps S101 to S107 corresponds to the image feature amount extracting process, and the processing performed in steps S108 and S109 corresponds to the identifying process for identifying the images based on the extracted feature amounts in steps S108 and S109, and dividing the images into a plurality of groups. While the image feature amount extracting process and the image organizing process are performed as a series of processes in the present exemplary embodiment, the two processes are not necessarily performed in a consecutive manner and may be performed separately at arbitrary timings.

In step S101 illustrated in FIG. 2, the acquisition unit 101 acquires a plurality of images. The acquisition unit 101 acquires images captured by an image capturing unit such as a digital camera or images stored in a storage unit (hard disk drive (HDD), etc.) in the feature extraction apparatus by use of an input device such as a scanner. In a case where the feature extraction apparatus includes an image capturing unit such as a digital camera, the acquisition unit 101 can also acquire images directly from the image capturing apparatus.

In step S102, the feature point detection unit 102 detects a vanishing point from the image acquired in step S101 by use of global information about the entire image. While a vanishing point is detected as a feature point of an image in the present exemplary embodiment, simply the center of an image or the center of gravity of a specific object may be detected. Further, in the present exemplary embodiment, a method discussed in Non-Patent Literature 1 (A Minakagwa et al., "Line Clustering with Vanishing Point and Vanishing Line Estimation", The Information Processing Society of Japan. CVIM, [Computer Vision and Image Media] 99(3), 65-72, 1999-01-21.) may be used as a method for the detection of a vanishing point by the feature point detection unit 102. In this method, first, a group of feature points is divided into clusters of points. The points of each cluster are supposed to be on the same straight line. Then, the straight lines are detected, and cross points at which the straight lines cross each other are detected as vanishing points. Further, a vanishing line is detected based on the plurality of obtained vanishing points.

Further, in step S102, the acquired images are classified into images in which a vanishing point is detected and images in which no vanishing point is detected. For the images in which no vanishing point is detected, the processing proceeds to a step in which the feature amount detection is performed by block segmentation. For only the images in which a vanishing point is detected, the processing proceeds to step S103 and the subsequent steps.

Next, in step S103, the setting unit 103 sets the vanishing point of the image as the origin of an image coordinate system. The lateral rightward direction of the image is the positive x-direction, and the longitudinal upward direction of the image is the positive y-direction.

Figure 7A:
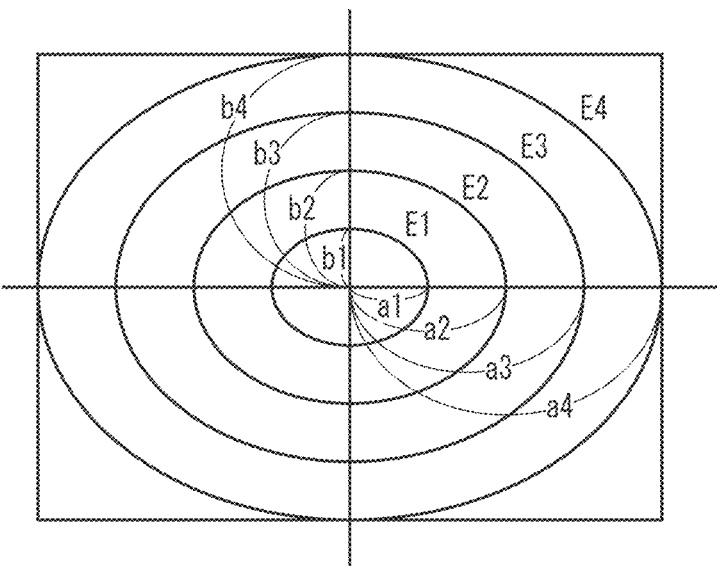
FIGS. 7A, 7B, and 7C each illustrate an image segmentation method according to an exemplary embodiment of the present invention.
Figure 7B:
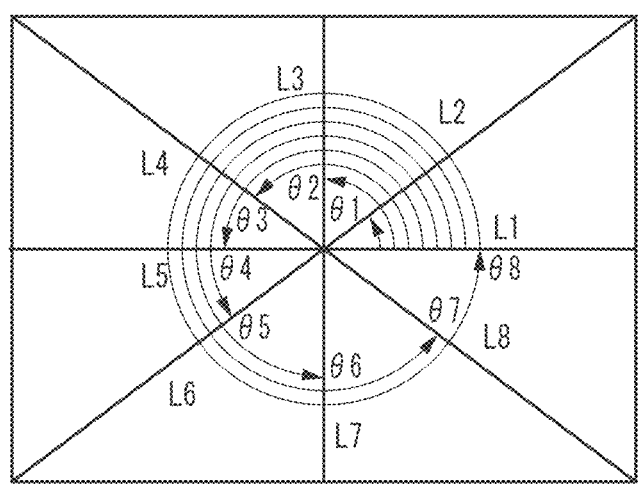
Figure 7C:
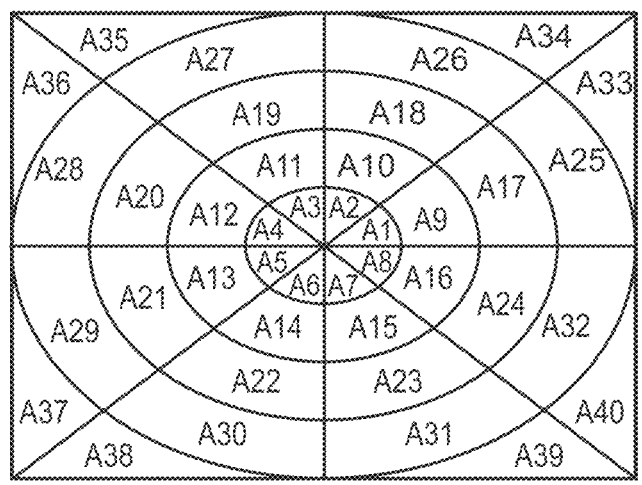

In step S104, the setting unit 103 sets m ellipses of different sizes that are centered at the origin set in step S103. FIGS. 7A, 7B, and 7C each illustrate an image segmentation examples according to the method described in the present exemplary embodiment. In the present exemplary embodiment, m=4 and four ellipses E1, E2, E3, and E4 are set. FIG. 7A illustrates how the image is segmented by the four ellipses. The x-direction radii $a1$, $a2$, $a3$, and $a4$ and y-direction radii $b1$, $b2$, $b3$, and $b4$ of the respective ellipses are set as follows:

$$E1: a1=(w/2)/4=w/8, b1=(h/2)/4=h/8,$$

$$E2: a2=2a1, b2=2b1,$$

$$E3: a3=3a1, b3=3b1, \text{ and}$$

$$E4: a4=4a1, b4=4b1, \quad \text{[Formula 1]}$$

where w is the width of the image, and h is the height of the image.

Then, in step S105, the setting unit 103 sets n half-lines from the origin as the start point and with a predetermined inclination angle. In the present exemplary embodiment, n=8 and eight half-lines are set. FIG. 7B illustrates how the image is segmented by the eight half-lines. As illustrated in FIG. 7B, half-lines L1, L2, L3, L4, L5, L6, L7, and L8 are set from a start line (positive direction of the x-axis) toward the positive direction (counterclockwise), and the inclination angles $\theta1$, $\theta2$, $\theta3$, $\theta4$, $\theta5$, $\theta6$, $\theta7$, and $\theta8$ of the respective half-lines are as follows. As described above, in the present exemplary embodiment, the image is segmented into a plurality of regions by the eight half-lines.

$$L1: \theta1=0,$$

$$L2: \theta2=\arctan(h/w),$$

$$L3: \theta3=\pi/2,$$

$$L4: \theta4=\pi-\theta2,$$

$$L5: \theta5=\pi,$$

$$L6: \theta6=\pi+\theta2,$$

$$L7: \theta7=3\pi/2, \text{ and}$$

$$L8: \theta8=2\pi-\theta2. \quad \text{[Formula 2]}$$

As a result, in the present exemplary embodiment, the image is segmented into forty segmented regions A1, A2, A3, ..., and A40 by the ellipses E1, E2, E3, and E4 and the half-lines L1, L2, L3, L4, L5, L6, L7, and L8 as illustrated in FIG. 7C.

In step S106, the feature extraction unit 104 extracts a feature amount from each segmented region of the image segmented in steps S104 and S105. Color information, geometric feature, color histogram, and binary pattern feature can be extracted as a feature amount. In the present exemplary embodiment, mean values of color information about respective R, G, and B channels are extracted as a feature amount. The feature extraction unit 104, by referring to all the pixels within a segmented region Ai, calculates mean values r, g, and b of the R, G, and B channels, respectively, in the segmented region Ai. A feature amount fi of the segmented region Ai is expressed by the following Formula 3:

$$fi=(r, g, b). \quad \text{[Formula 3]}$$

The feature extraction unit 104 performs the feature amount extraction on all the segmented regions A1 to A40 to acquire a feature amount F of the entire image. The feature amount F reflects composition information about the entire image and is expressed by the following Formula 4:

$$F=(f1, \ldots, f40). \quad \text{[Formula 4]}$$

Depending on the position of the vanishing point, the segmented region Ai may be outside the image. In this case, the feature extraction cannot be performed on the image, so that a flag corresponding to "NA" (i.e., Not Available) may be given to the feature amount fi. Further, in step S106, the extracted feature amount is output by the output unit 105. The output format may be a text file in which numerical values of the feature amounts are listed or a binary file in which numerical values of the feature amounts are binarized. In a case where the organizing of the image is also to be performed as a series of processes as in the present exemplary embodiment, the feature amount may be output as data to the storage unit (memory, etc.) in the feature extraction apparatus.

In step S107, it is determined whether the feature amount extraction is performed on all the images acquired in step S101. If it is determined that the feature amount extraction is performed on all the acquired images (YES in step S107), the processing proceeds to step S108. On the other hand, if the feature amount extraction is not performed on all the acquired images (NO in step S107), the processing returns to step S102, and the feature amount extraction is performed on the remaining images.

Processing in step S108 and the subsequent steps is performed following the image feature extraction processing in the present exemplary embodiment. In the processing, the image is divided into several groups based on the extracted feature amount. In a case where the image has been already divided into groups in this step and a new image is to be organized with respect to the existing groups, step S108 is skipped, and the image is organized in step S109, which will be described below.

In step S108, the clustering unit 106 performs clustering on the feature amount F acquired in step S106. For example, in a case where the number of acquired images is N, in step S106, the feature extraction unit 104 calculates a feature amount F of each of the N images and, i.e., N feature amounts F are extracted. In step S108, the images are classified into several groups by clustering the feature amounts F reflecting composition information. Each of the feature amounts F includes the feature amounts f1 to f40 extracted from the segmented regions A1 to A40, respectively. If any of the feature amounts f1 to f40 of the feature amount F is "NA", the feature amount F is excluded.

In the present exemplary embodiment, the feature amounts F are clustered using known K-means. The letter "K" in the K-means refers the number of clusters to be formed. In the K-means clustering, K pieces of data are randomly selected from given N pieces of data. The K pieces of data are referred to as seeds. Next, each piece of data is associated with a cluster of the nearest seed. Then, the center of gravity of each cluster is calculated to obtain new seeds, and the clustering is performed again. The foregoing processing is repeated until the clustering result no longer changes, and then the processing is ended. In this way, the N pieces of data are clustered into K clusters. In the present exemplary embodiment, the feature amounts F are clustered using K-means, so that even if there are a large number of images, the images having a similar feature amount can be gathered and organized.

In step S109, a new image is assigned in the case where clusters have been already obtained in step S108. In the present exemplary embodiment, the feature amount F of a new image to be organized has been already obtained by the processing up to step S107, and the clustering unit 106 compares the feature amount F with the mean feature amounts of the clusters. Then, the new image is assigned to the cluster of the smallest distance between the feature amount F and the mean feature amount of the cluster. The foregoing processing enables continuous image management even in the case where the acquisition unit 101 acquires a new image.

In the present exemplary embodiment, an image including a vanishing point is segmented into a plurality of segmented regions by a combination of ellipses and half-lines, and a feature amount is extracted from each of the segmented regions. This configuration according to the present exemplary embodiment enables extraction of an image feature reflecting composition information, so that a global feature can be extracted appropriately from the image including the vanishing point.

A configuration will be described, in which semantic region segmentation processing is performed on images divided into clusters (groups) by the feature extraction apparatus according to the present exemplary embodiment. The semantic region segmentation is the processing that is additionally executable on an image divided into clusters (groups) generated in step S108 in the present exemplary embodiment. In the present exemplary embodiment, the semantic region segmentation refers to the processing in which an image is segmented into small regions and a "meaning" such as "sky" or "tree" is given to the small regions.

Figure 3:
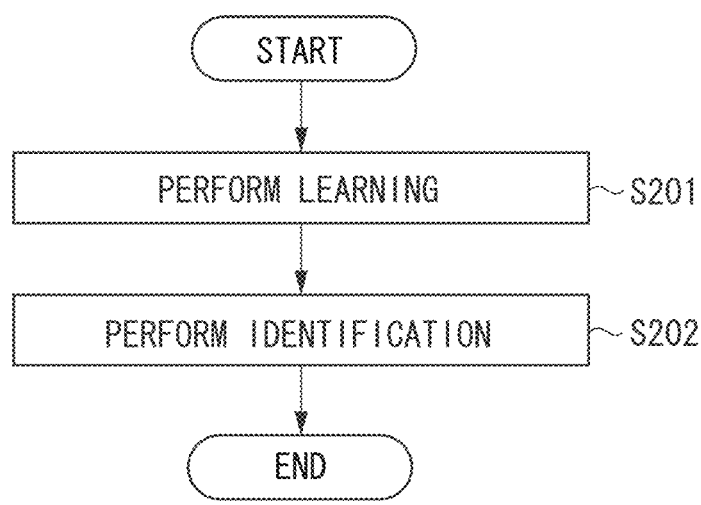
FIG. 3 illustrates a flow of a semantic region segmentation process according to an exemplary embodiment of the present invention.

FIG. 3 illustrates a flow of the semantic region segmentation process according to the present exemplary embodiment. It is premised that, prior to the execution of the semantic region segmentation according to the present exemplary embodiment, the clustering unit 106 has already performed clustering on the feature amounts F in step S108 as described above. Then, in step S201 illustrated in FIG. 3, the learning process is performed to learn classifiers with respect to the respective clusters obtained by clustering unit 106.

Figure 6A:
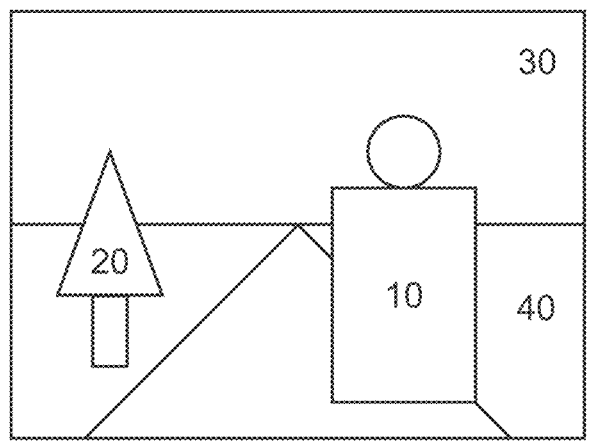
FIGS. 6A and 6B schematically illustrate an input image and a correct answer label image, respectively, according to an exemplary embodiment of the present invention.
Figure 6B:
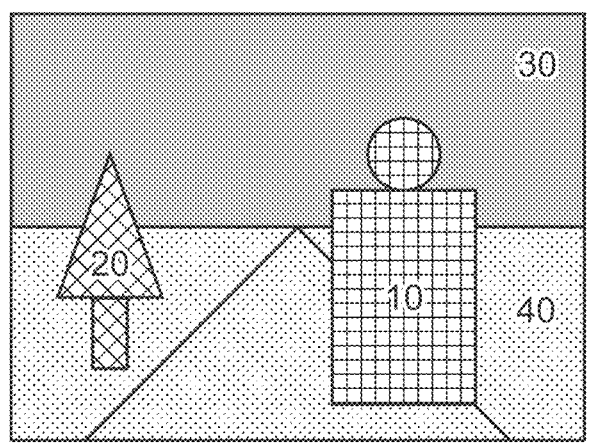

In step S201, a correct answer label image is prepared with respect to an input image in advance. A label refers to an object to be identified, and examples include "human", "tree", "sky", "others", etc. A label image is an image in which each pixel of a given image is given a label indicating what the object is. In the label image, specific colors may be assigned to the respective labels to express the labels. A correct answer label image refers to an image in which a label recognized as a correct label is input in advance to each pixel of an input image. FIGS. 6A and 6B schematically illustrate an input image and a correct answer label image, respectively. In the present exemplary embodiment, as illustrated in FIG. 6B, different labels "human", "tree", "sky", and "others" are given to pixels of regions 10, 20, 30, and 40 in the input image illustrated in FIG. 6A. The correct answer label image is accumulated in the storage unit in the feature extraction apparatus. Further, the classifier outputs a label when a feature amount is given. In the present exemplary embodiment, a known identification method such as a support vector machine, a neural network, and a logistic regression method can be used.

Figure 4:
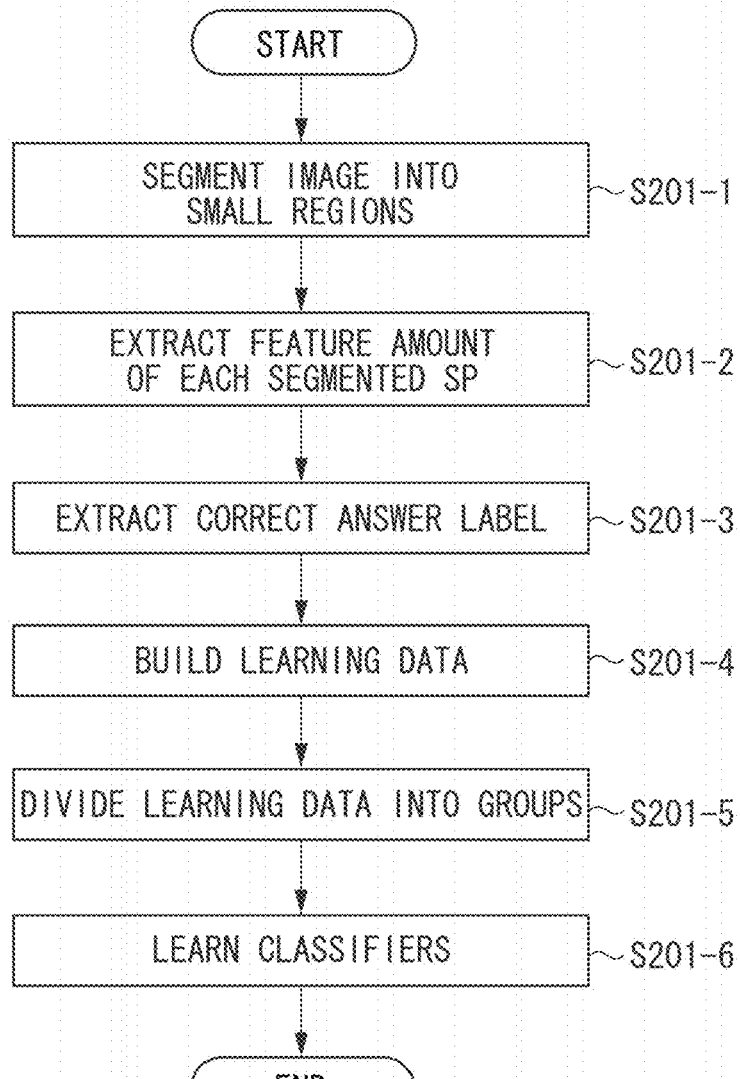
FIG. 4 illustrates a flow of a detailed process in a learning process according to an exemplary embodiment of the present invention.

FIG. 4 illustrates a flow of a detailed process in the learning process in step S201 in FIG. 3. In step S201-1 in FIG. 4, the small-region segmentation unit 107 performs the small region segmentation on the images existing in the storage unit. A small region is a group of visually-similar pixels and is referred to as a "super-pixel" (hereinafter, "SP"). A small-region segmentation method discussed in Non-Patent Literature 1 or in Non-Patent Literature 2 (Efficient Graph-Based Image Segmentation, P. F. Felzenszwalb, IJCV2004.) may be used to segment an image into SPs.

In step S201-2, the feature extraction unit 104 extracts a feature amount of each segmented SP. Color information, geometric feature, position information, color histogram, and binary pattern feature can be extracted as a feature amount.

In step S201-3, the label extraction unit 108 extracts correct answer labels of the SPs. The label extraction unit 108 first clips a region corresponding to the SP from the correct answer label image, and the correct answer labels are counted with respect to all the pixels within the region corresponding to the SP. Then, the label extraction unit 108 extracts the label the number of which is the largest from among the counted correct answer labels as the correct answer label of the SP. For example, assume that correct answer labels are counted with respect to the acquired SP having 100 pixels, and there are 90 pixels with a "sky" label and 10 pixels with a "tree" label. Since the label the number of which is the largest is the "sky" label, the label extraction unit 108 extracts the "sky" label as the correct answer label of the SP.

In step S201-4, the label extraction unit 108 performs the pairing of the SP feature amount with the correct answer label on all the SPs of all the learning images to build learning data. Then, in step S201-5, the learning data distribution unit 109 divides information on the SP feature amount paired with the correct answer label serving as the learning data into K groups corresponding to each cluster. In step S201-6, the classifiers of the respective K divided groups are learned to construct K learned classifiers. The learned classifiers are stored in, for example, the storage unit in the feature extraction apparatus.

Figure 5:
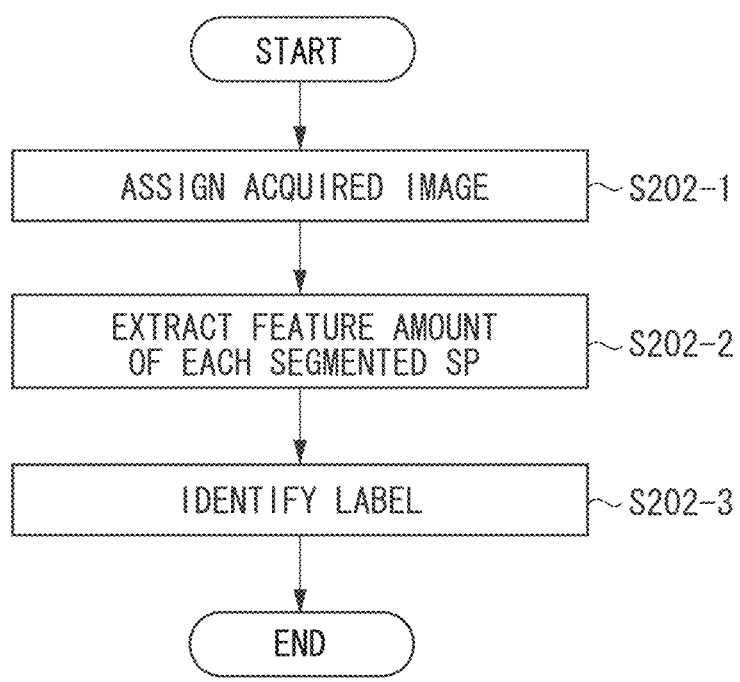
FIG. 5 illustrates a flow of a detailed process in an identification process according to an exemplary embodiment of the present invention.

Referring back to FIG. 3, after the K leaned classifiers are constructed for the respective clusters in step S201, the processing proceeds to step S202. In the identification process in step S202, semantic region segmentation is performed using the learned classifiers. FIG. 5 illustrates a flow of detailed processing of the identification process in step S202 in FIG. 3.

As described above, it is premised that, prior to the execution of the semantic region segmentation, the processing up to the clustering of the feature amount F has been performed by the clustering unit 106. Thus, in step S202-1, the acquisition unit 101 assigns the acquired image to one of the classifiers of the respective clusters, and the small-region segmentation unit 107 performs the SP segmentation on the acquired image.

Then, in step S202-2, the feature extraction unit 104 extracts a feature amount of each segmented SP. Then, in step S202-3, the label acquisition unit 110 inputs the feature amount to the classifier corresponding to the assigned cluster, so that the label of the SP is identified. The labels of all the segmented SPs are identified as described above, so that a label image with respect to the identification image can be acquired.

In the present exemplary embodiment, instead of identifying an image by an general-purpose classifier in which a single classifier is used with respect to all learning images, an image is identified by a dedicated classifier in which classifiers for respective clusters based on a vanishing point are used. With this configuration, according to the present exemplary embodiment, it is possible to set an appropriate dedicated classifier and identify images with high-accuracy.

While the ratio of the x-direction radius and the y-direction radius of an ellipse set by the setting unit 103 is set to be the same as the width-to-height ratio (aspect ratio) of the image in the present exemplary embodiment, the ratios may be different. Further, the foregoing description of the present exemplary embodiment is not intended to exclude an exemplary embodiment in which the x-direction radius is equal to the y-direction radius, i.e., a precise circle. Further, while the setting unit 103 sets the x- and y-direction radii of each ellipse at regular intervals in the present exemplary embodiment, the radii may be at intervals other than regular intervals. Further, the inclination angles of the half-lines may also be at intervals other than regular intervals.

Further, while both the ellipses and the half-lines are set based on the vanishing point of the image to segment the image in the present exemplary embodiment, only one of an ellipse and a half-line may be set to segment an image. To segment an image only by an ellipse, at least one ellipse is needed. To segment an image only by a half-line, at least two half-lines are needed. Specifically, in the feature extraction method according to the present exemplary embodiment, an ellipse and a half-line may be set to satisfy the condition that n is an integer satisfying $n \geq 2$ in a case where $m=0$ or n is an integer satisfying $n \geq 0$ in a case where m is an integer satisfying $m \geq 1$.

Further, while the number m of ellipses is $m=4$ and the number n of half-lines is $n=8$ in the present exemplary embodiment, the two parameters m and n may be set appropriately, for example, as follows. First, a list of candidate parameters (m, n) is generated. For example, candidate parameters m are $m=2, 3, 4$, and $5$, and candidate parameters n are $n=4, 8, 16$, and $32$. Therefore, the list of candidate parameters (m, n) is (m, n)=(2, 4), (2, 8), (2, 16), (2, 32), ..., (5, 4), (5, 8), (5, 16), and (5, 32).

Next, the radius "a" of an ellipse is set with respect to the values "m" in the candidate list. The x-direction radius "a" and the y-direction radius "b" of an ellipse can be expressed by the following Formula 5:

$$E1: a1=(w/2)/m=w/(2m), b1=(h/2)/m=h/(2m),$$

$$E2: a2=2a1, b2=2b1, \text{ and}$$

$$Em: am=ma1, bm=mb1, \quad \text{[Formula 5]}$$

where w is the width of the image, h is the height of the image, and E1, E2, ..., Em are m ellipses centered on the vanishing point and arranged from the inside to the outside.

Further, n half-lines L1, L2, ..., Ln are set from the start line (positive direction of the x-axis) toward the positive direction (counterclockwise) with respect to the n ellipses set in advance. The inclination angles of the respective half-lines can be expressed by the following Formula 6:

$$L1: \theta 1=0,$$

$$L2: \theta 2=2\pi/n,$$

$$\ldots, \text{and}$$

$$Ln: \theta n=(n-1)(2\pi/n). \quad \text{[Formula 6]}$$

Figure 8:
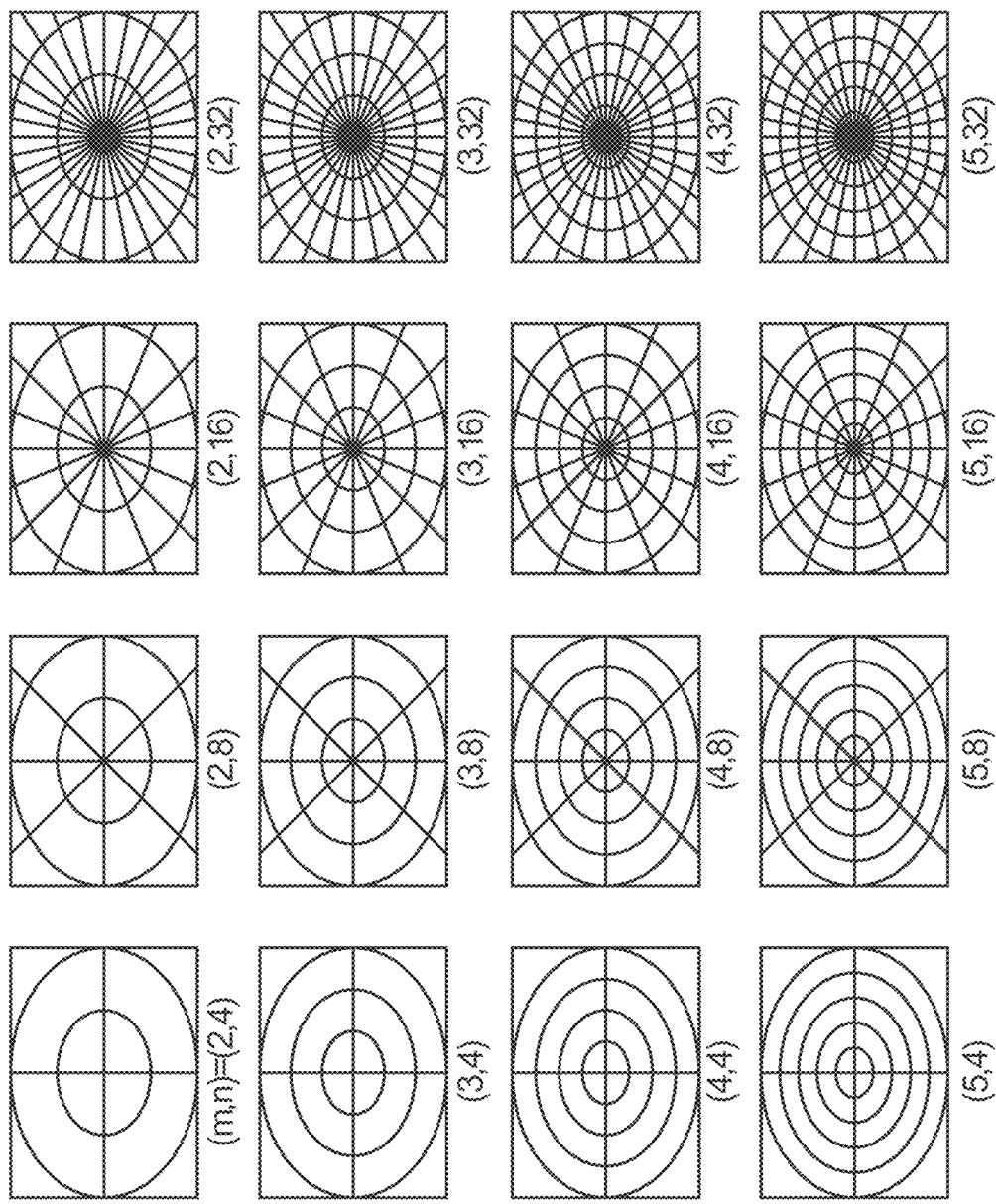
FIG. 8 illustrates patterns of ellipses and half-lines that segment a composition of an image according to an exemplary embodiment of the present invention.

In the case where the radii of the ellipses and the inclination angles of the half-lines are set as described above, patterns of the ellipses and the half-lines by which the composition of the image is segmented according to the candidate list of (m, n) are illustrated in FIG. 8.

Next, the learning images with the correct answer label images are divided into halves to obtain a learning image and an identification image. Then, the learning image is segmented by the ellipses and the half-lines of the candidate list (m, n), and a plurality of clusters is obtained by the method according to the present exemplary embodiment described above.

Next, in order to evaluate the clusters, the identification image with the correct answer label image is assigned to the plurality of obtained clusters. This processing can be performed similarly as in step S109 described above. The closer the output label image output from a cluster is to the correct answer label image, the higher the accuracy of the output label image is, and an accuracy index indicating the degree of agreement is set to evaluate the cluster. In this way, the accuracy index is set to evaluate all the clusters. Then, the parameters (m, n) corresponding to the cluster determined as having the highest accuracy are determined as optimum parameters.

Thereafter, the optimum parameters (m, n) determined as described above are used when the feature amount extraction as well as the semantic region segmentation are performed on an image with no correct answer label image that is acquired by the acquisition unit 101, whereby highly-accurate results can be obtained.

As described above, in the feature detection method according to the present exemplary embodiment, an image including a vanishing point is segmented into a plurality of segmented regions by use of a combination of an ellipse and half-lines, and a feature amount is extracted from each segmented region. This configuration according to the present exemplary embodiment enables extraction of image features reflecting composition information, so that an appropriate global feature of the image including the vanishing point can be extracted. Especially, in the present exemplary embodiment, not straight lines but half-lines are set to segment an image. In this way, the extraction of feature amounts can be appropriately performed on an image. For example, an image can be segmented into three regions by three half-lines with inclination angles of 0°, 120°, and 240°, respectively.

Further, in the present exemplary embodiment, when a "meaning" such as "sky" or "tree" is given to small regions obtained by segmenting an image divided into clusters (groups), the image is identified by a dedicated classifier in which classifiers for the respective clusters based on a vanishing point are used. The foregoing configuration according to the present exemplary embodiment enables highly-accurate identification of images.

In the exemplary embodiment described above, detection of a feature point (vanishing point) is performed on an image, and if a feature point is detected, an ellipse and half-lines are set with respect to the feature point to segment the image into a plurality of regions. An exemplary embodiment of the present invention is not limited to the foregoing exemplary embodiment. For example, an exemplary embodiment of the present invention is also applicable to processing to be performed on a panoramic image.

Figure 9:
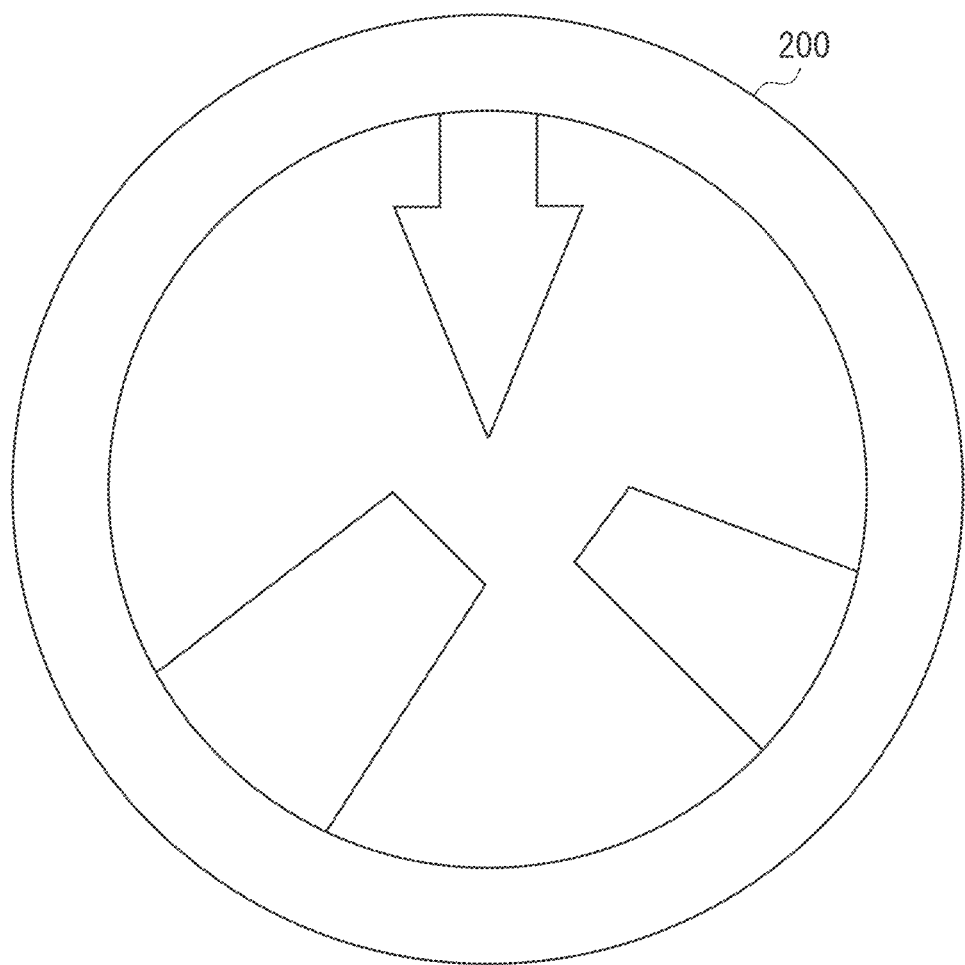
FIG. 9 illustrates an example of a panoramic image according to another exemplary embodiment.

A panoramic image refers to an omnidirectional, 360-degree panoramic image and can be captured by an omnidirectional camera. While a panoramic image can be viewed as an image attached to a sphere from the center of the sphere by use of a dedicated viewer, all the information may be gathered inside a circle to view the image as a single flat image. FIG. 9 illustrates an example of the latter panoramic image 200.

An exemplary embodiment of the present invention is also applicable to the latter panoramic image. Specifically, the feature point detection unit 102 detects a feature point (center of the image) of the panoramic image 200, and the setting unit 103 sets ellipses and half-lines with respect to the detected feature point (center of the image). Then, a feature amount is extracted from each segmented region segmented by the set ellipses and half-lines. With the foregoing configuration, even if there are a large number of panoramic images, the images having a similar feature amount can be gathered and organized.

The foregoing configuration according to an exemplary embodiment of the present invention enables appropriate extraction of a global feature of an image including a vanishing point.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242461, filed Nov. 28, 2014, which is hereby incorporated by reference herein in its entirety.

What is claimed is:

1. A feature extraction method comprising:
   acquiring an image;
   detecting a vanishing point in the acquired image;
   setting m ellipses and n half-lines centered on the detected vanishing point to segment the image into a plurality of regions;
   extracting a feature of a region segmented by the set ellipses and half-lines; and
   classifying the image into a plurality of groups by extracting features of the segmented regions and clustering the plurality of extracted features into the plurality of groups,
   wherein, in a case where m=0, n is an integer satisfying n≥2, and in a case where m is an integer satisfying m≥1, n is an integer satisfying n≥0.

2. The feature extraction method according to claim 1, wherein in the setting, the plurality of ellipses is set so that x-direction radii and y-direction radii are arranged at regular intervals.

3. The feature extraction method according to claim 1, wherein in the setting, the plurality of half-lines is set so that inclination angles between adjacent half-lines are formed at regular intervals.

4. The feature extraction method according to claim 1, wherein in the extracting, any one of color information, geometric feature, color histogram, and binary pattern feature is extracted as a feature of the segmented region.

5. The feature extraction method according to claim 1, wherein in the classifying, a label of a small region of the image is identified based on the features of the segmented regions of the image divided into the plurality of groups by use of information about a correct answer label and a feature of the small region of the image which is held with respect to each of the plurality of groups.

6. The feature extraction method according to claim 1, further comprising learning, by use of an image with a correct answer label, information about the correct answer label and a feature of a small region of the image.

7. The feature extraction method according to claim 1, further comprising:
dividing the acquired image into a plurality of blocks and extracting a feature from the plurality of blocks in a case where the vanishing point is not detected from the acquired image.

8. A feature extraction apparatus comprising:
at least one processor connected to a memory and configured to execute instructions that, when executed, cause the feature extraction apparatus to:
acquire an image;
detect a vanishing point in the image acquired by an acquisition unit;
set m ellipses and n half-lines centered on the vanishing point to segment the image into a plurality of regions;
extract a feature of a region segmented by the ellipses and the half-lines set by a setting unit; and
classify the image into a plurality of groups by extracting features of the segmented regions and clustering the plurality of extracted features into the plurality of groups,
wherein, in a case where $m=0$, n is an integer satisfying $n \geq 2$, and in a case where m is an integer satisfying $m \geq 1$, n is an integer satisfying $n \geq 0$.

9. A non-transitory computer-readable recording medium that stores a program for causing a computer to execute a feature extraction process comprising:
acquiring an image;
detecting a vanishing point in the acquired image;
setting m ellipses and n half-lines centered on the vanishing point to segment the image into a plurality of regions;
extracting a feature of a region segmented by the set ellipses and the set half-lines; and
classifying the image into a plurality of groups by extracting features of the segmented regions and clustering the plurality of extracted features into the plurality of groups,
wherein, in a case where $m=0$, n is an integer satisfying $n \geq 2$, and in a case where m is an integer satisfying $m \geq 1$, n is an integer satisfying $n \geq 0$.

* * * * *